UNITED STATES PATENT OFFICE.

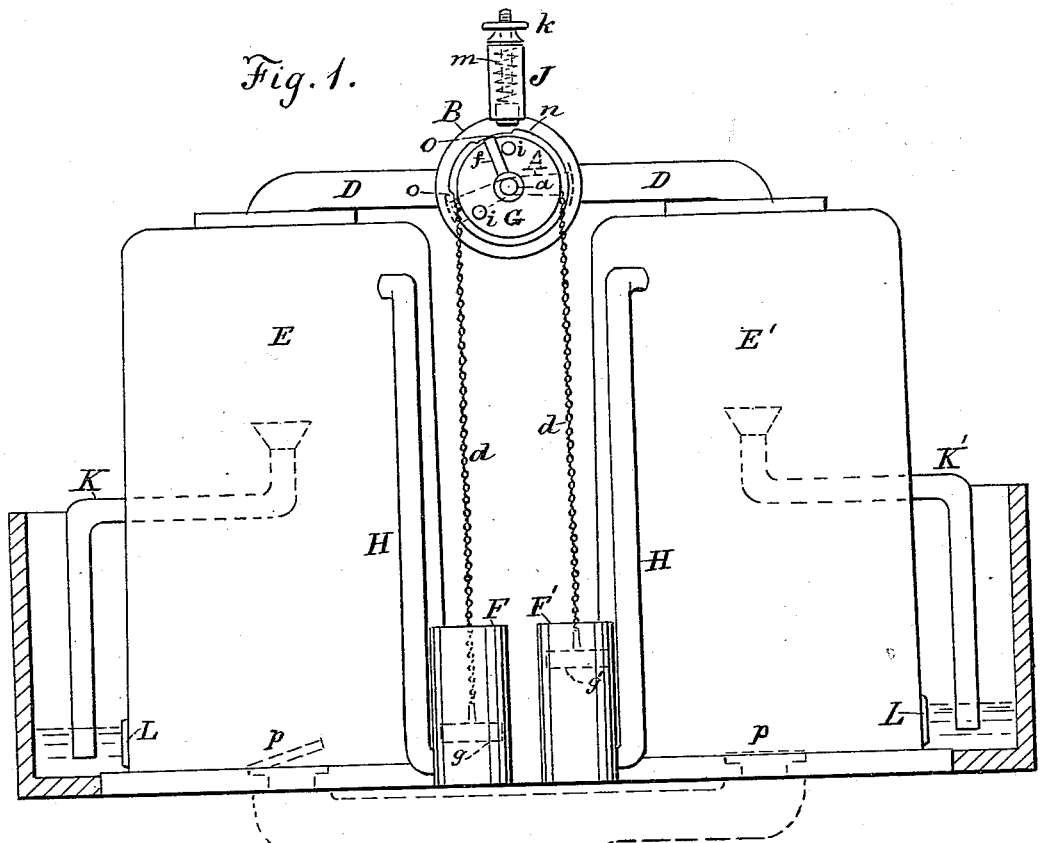
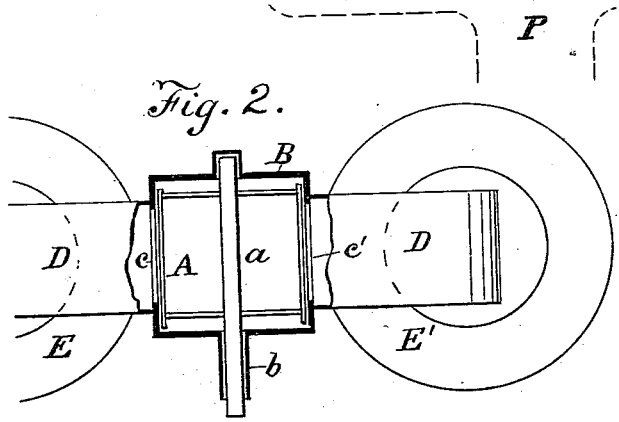
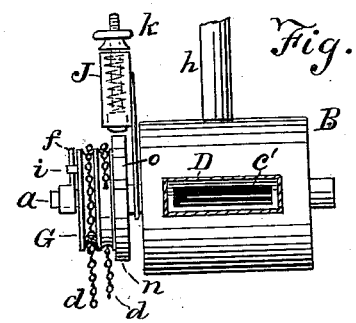

OWEN R. DAVIS, OF YORK, PENNSYLVANIA, ASSIGNOR OF ONE-HALF OF HIS RIGHT TO LEVI MAISH, OF SAME PLACE.

STEAM VACUUM-PUMP.

SPECIFICATION forming part of Letters Patent No. 226,285, dated April 6, 1880.

Application filed October 30, 1879.

*To all whom it may concern:*

Be it known that I, OWEN R. DAVIS, of York, in the county of York and State of Pennsylvania, have invented certain new and useful Improvements in Steam Vacuum-Pumps; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to that class of steam vacuum-pumps in which steam is admitted into the same chamber with and presses against the water.

In my improved construction an oscillating valve works within a circular valve-box having two ports communicating with vacuum-chambers, said ports being each alternately opened and closed by said valve; and on a hollow bearing projecting from said valve-box is a pulley or wheel, to which is attached two cords or chains extending to and connected with two pistons in cylinders, each of the latter communicating by a pipe with one of the said vacuum-chambers. Further, the stem of the said valve projecting through the tubular bearing of said pulley has a fixed arm rigidly attached to its outer end, two pins on the face of the pulley alternately acting against said fixed arm as the pulley is partially rotated, thus causing the valve to operate. There is also provided a spring-brake, which presses against a rim of said pulley, and is regulated by means of a thumb-nut, the rim having depressions which serve to relieve the pulley from pressure, as required in the operation.

In the accompanying drawings, Figure 1 is a front elevation of the steam pumping apparatus. Fig. 2 is a sectional plan of valve-box and connecting parts. Fig. 3 is a side view of the valve-box and other details.

In the drawings referred to, A designates the oscillating valve within a circular valve-box, B, having governing-ports $c$ and $c'$ opening into tubes D leading to vacuum-chambers E and E'. A hollow bearing, $b$, projects from the valve-box B, and on said bearing is a wheel or pulley, G. F and F' are two cylinders, in each of which is a piston, $g$ and $g'$, that is connected by means of a chain or cord, $d$, with the periphery of the wheel or pulley G. The pipes H form communication between the cylinders F and F' and the chambers E and E', respectively.

The valve shaft or stem $a$ extends through the hollow bearing $b$, and on the end of said stem is rigidly fastened an arm, $f$, which is moved by pins $i$, fixed in the face of wheel G, as shown. A pipe, $h$, conducts steam to the valve-box B.

K and K' represent condensing-pipes passing into the vacuum-chambers, said chambers being provided with discharge-ports L, having valves opening outwardly. P indicates the induction-pipe leading to chambers E and E', having valves $p$ at the ports of induction.

In operation, supposing the port $c$ to be open and the port $c'$ closed, the steam passes through the valve-box to chamber E, and, coming in contact with the cold inner surface of the chamber and with the water, becomes condensed. A vacuum is thus produced, and the water rises into chamber E through condenser K and pipe P. The cylinder F being in communication with chamber E by means of pipe H, the vacuum causes the piston $g$ to be drawn downward, so that the pulley G is partially rotated, and a pin, $i$, is brought against the arm $f$, which causes the valve to turn, closing port $c$ and opening port $c'$, through which the steam then passes to the chamber E', where a vacuum immediately commences forming and a similar operation follows.

J designates a brake, which presses against a rim, $n$, of the wheel G, said brake being actuated by a spiral spring, $m$, and regulated by a thumb-nut, $k$. Depressions $o$ are formed in the rim $n$, so that the wheel G, as it turns, is relieved of the pressure of the brake. The object of the brake is to regulate the movement of the wheel G, and consequently the movement of the pistons $g$ and $g'$, so that each of the vacuum-chambers will fill with water by the time the relative piston is drawn near the bottom of its cylinder. The pressure of the brake on the rim $n$ continues until a pin, $i$, strikes the arm f, when the wheel G is relieved from pressure by a depression, o, and the whole force is then applied to the movement of the valve A.

I claim—

1. In a steam vacuum-pump, the oscillating valve A in the valve-box B, said valve having a stem extending through a tubular bearing projecting from said valve-box, and provided at its end with the fixed arm f, in combination with the wheel G, provided with pins i, and operating the pump-pistons, substantially as and for the purposes set forth.

2. In a steam vacuum-pump, a valve-box communicating with two vacuum-chambers and provided with the tubular bearing b, supporting wheel G, the valve in said box being operated by means of two pistons connecting with said wheel G, which is provided with pins i to act against the arm f fastened to the shaft a, the latter extending through said tubular bearing, substantially as set forth and described.

3. In a steam vacuum-pump, the oscillating valve A, having the stem a, the box B, communicating with the chambers E and E' and having the tubular bearing b, supporting the wheel G, connected by cords or chains d with the pistons in the cylinders F and F', the latter communicating with the chambers E and E', all arranged as set forth.

4. In a steam vacuum-pump, in combination with the brake J, the wheel G, provided with the rim n, having depressions o, for the purpose set forth.

In testimony that I claim the foregoing I have hereunto set my hand this 27th day of September, 1879.

OWEN R. DAVIS.

Witnesses:
GEORGE M. SHELTER,
R. HOFFHEINS.